United States Patent

Neff

[15] 3,706,423

[45] Dec. 19, 1972

[54] AUTOMATIC LOADING AND UNLOADING TAPE TRANSPORT APPARATUS UTILIZING A CAPTIVE LEADER

[72] Inventor: Joseph J. Neff, Pasadena, Calif.

[73] Assignee: Bell & Howell Company, Chicago, Ill.

[22] Filed: Jan. 4, 1971

[21] Appl. No.: 103,509

[52] U.S. Cl. ....................242/195, 242/210, 226/92, 352/158

[51] Int. Cl. ..........................G03b 1/04, G11b 15/32

[58] Field of Search ..............242/191–195, 206–210; 226/91, 92; 352/157–158

[56] References Cited

UNITED STATES PATENTS 3,136,464 6/1964 Schmid..................................226/91

3,257,515 6/1966 Nakamatsu.........................226/92 X

*Primary Examiner*—Leonard D. Christian

*Attorney*—David Weiss

[57] ABSTRACT

Captive leader web loading and unloading apparatus for automatically capturing the free end of a take-up leader extending along the web transport path, at the conclusion of the supply web rewind operation. A capture device automatically decouples a supply leader from the captive leader without requiring the application of auxiliary motions to the supply reel after rewind. The device includes a bistable mechanism having a first stable configuration for cooperating with the take-up leader such that the take-up leader is captured along the web transport path, and a second stable configuration for releasing the take-up leader when coupled to the supply leader. The bistable mechanism is actuated to assume its first stable configuration, by the take-up leader during decoupling from the supply leader. After automatic coupling of the take-up leader and the supply leader, the take-up leader actuates the bistable mechanism to assume its second stable configuration.

14 Claims, 8 Drawing Figures

Joseph J. Neff,
INVENTOR.
BY
ATTORNEY

PATENTED DEC 19 1972

3,706,423

SHEET 2 OF 3

Joseph J. Neff,
INVENTOR.
BY.

ATTORNEY.

Joseph J. Neff,
INVENTOR.
BY.
David Weiss
ATTORNEY.

AUTOMATIC LOADING AND UNLOADING TAPE TRANSPORT APPARATUS UTILIZING A CAPTIVE LEADER

BACKGROUND OF THE INVENTION

1. Field of the Invention

This invention relates to web threading apparatus, and more particularly to web transport apparatus including a captive take-up leader wherein the supply web is automatically coupled to the captive leader for threading the web along a web transport path and wherein the supply web is automatically decoupled from the captive leader at the conclusion of a rewind operation.

Although the present invention is described herein with respect to magnetic tape apparatus, the invention can be applied to any web transport apparatus, and more particularly to effect automatic threading and release of film in motion picture projectors and cameras.

2. Description of the Prior Art

Web transport apparatus utilizing a captive leader—i.e., a take-up leader having one end secured to an empty take-up reel and its free end retained at a supply reel station at the conclusion of each rewind of the supply web, the length of the captive leader being sufficient to completely span the web transport path—are well-known to the prior art. In U.S. Pat. No. 1,655,297 (issued in 1928 to Thornton), the captive leader concept is taught in relation to threading motion picture film through a projector, utilizing a T-shaped tab at the free end of the captive leader which is manually insertable through a cooperating eye near the free end of a supply film or a supply leader secured to the supply film.

The captive leader concept has been applied to effect automatic web threading, predominantly in magnetic recorder/playback apparatus. In such prior art systems, auxiliary motions have been required to disengage or decouple the supply leader from the captive leader at the supply station after rewind. For example, in U.S. Pat. No. 3,197,150 (issued in 1965 to Camras), a control finger (which is biased against the supply tape during rewind onto a supply cartridge) is moved away from the supply leader at the conclusion of the rewind operation, while the take-up reel is rotated slightly opposite the rewind direction for disengaging a take-up leader hook from a supply leader eye.

In U.S. Pat. No. 3,153,516 (issued in 1964 to De Loof et al.), the captive leader end is formed into a lateral hook which mates with a loop at the end of the tape in a supply cartridge during lateral placing movement of the cartridge in a supply position. Lateral movement of the supply cartridge after rewind apparently causes the loop to laterally retract from the hook.

In U.S. Pat. No. 3,105,646 (issued in 1963 to Polley et al.), the free end of the supply tape has attached thereto a bifurcated element which defines a vertically disposed channel way for mating with a corresponding coupler attached to the captive leader. After rewind, disengagement is effected by vertical removal of the supply cartridge from the transport apparatus.

The captive leader web transport apparatus known to the prior art, for automatic "loading" of the supply web—i.e., for automatically threading the supply web through the transport path thereafter permissive of normal transport operations as provided by conventional transport apparatus—does not teach apparatus for permitting truely automatic decoupling at the conclusion of the rewind operation, i.e., without the requirement of a change in the movement of the supply cartridge or reel after rewind.

SUMMARY OF THE INVENTION

The apparatus of the present invention provides a take-up leader capture device, for automatically capturing the end of a take-up leader extending along the web transport path, at the conclusion of the supply web rewind operation. The capture device automatically decouples the supply leader from the captive leader without requiring the application of auxiliary motions to the supply reel after rewind.

The capture device of the present invention includes a bistable mechanism having a first stable configuration for cooperating with the take-up leader such that the take-up leader is captured along the web transport path, and a second stable configuration for releasing the take-up leader when coupled to the supply leader. The bistable mechanism is actuated to assume its first stable configuration, by the take-up leader during decoupling from the supply leader. After automatic coupling of the take-up leader and the supply leader, the take-up leader actuates the bistable mechanism to assume its second stable configuration.

Unlike the various supply and captive take-up leaders disclosed in the prior art wherein a hook or tab is provided by the take-up leader for cooperation with an aperture or eye in the supply leader, the preferred configuration of the supply and captive take-up leader of the present invention is provided with an aperture in the captive take-up leader for coupling cooperation with a tab or button provided by the supply leader. This arrangement is effective in permitting automatic decoupling by a stationary stripper means provided by the preferred embodiment of the capture device of the present invention.

The preferred configuration of the supply and captive take-up leader further includes longitudinally spaced apertures therein which, when the leaders are coupled and would on the take-up reel hub, provide a well into which the couplement is recessed for preventing physical distortion of the web when wound onto the take-up reel.

BRIEF DESCRIPTION OF THE DRAWINGS

The novel features which are believed to be characteristic of the present invention, together with further advantages thereof, will be better understood from the following description considered in connection with the accompanying drawings in which a preferred embodiment of the invention is illustrated by way of example, and wherein like reference numerals are utilized to indicate like components. It is expressly understood, however, that the drawings are for the purpose of illustration only and are not intended as a definition of the invention.

DESCRIPTION OF THE PREFERRED EMBODIMENT

Figure 1:
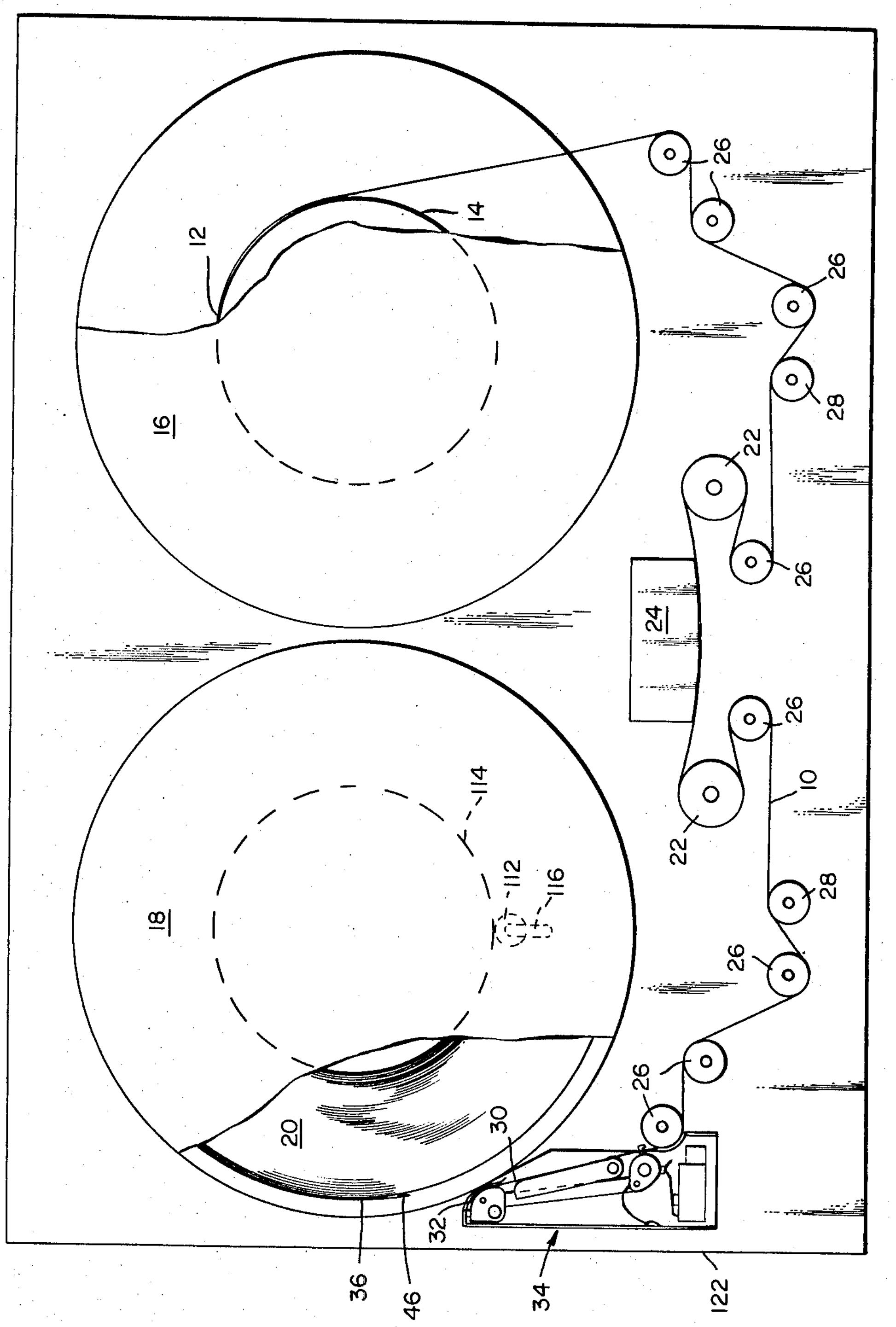
FIG. 1 is a plan view of a preferred embodiment of the automatic supply "loading" and "unloading" apparatus in accordance with the present invention, shown in its web "unloaded" condition and in operative combination with magnetic tape recorder/playback apparatus.

Turning first to FIG. 1, a flexible strip take-up leader 10 (to be more fully described later) has one end 12 fixidly secured to a web take-up means such as a hub 14 of a take-up reel 16. In conventional tape recorder/playback apparatus, a supply reel 18 is ordinarily provided with magnetic tape 20 wound therein which, during transport, extends between the supply reel 18, in tape-driving engagement with capstan means (such as a pair of capstans 22), in magnetic contact with a transducer assembly 24 (including magnetic head units) and to the take-up reel 16 for permitting the transported tape 20 to be wound therein. The tape is transportable along a predetermined tape transport path, and conventional tape transport apparatus generally includes a combination of idler rollers 26 and edge guide posts 28 positioned along the path for maintaining the transported tape in the tape transport path during transducing operations, in addition to reel drive motors (not shown) for driving the supply reel 18 and the take-up reel 16.

The take-up leader 10 is threaded along the tape transport path, except that an end portion 30 of the leader (including the leader's free end 32) is removed from the tape path and "captured" by a capture device 34 when the tape transport apparatus is in its web unloaded condition as shown in FIG. 1.

Figure 2:
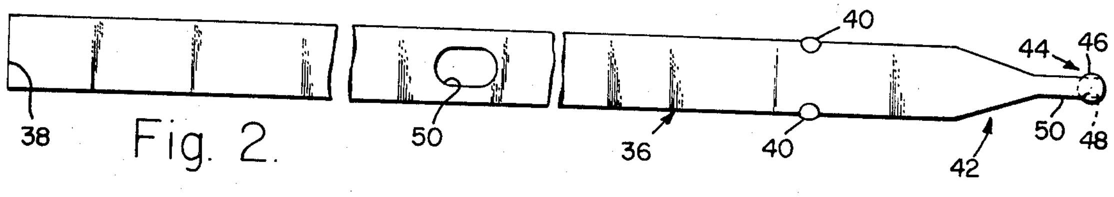
FIG. 2 is a fragmentary plan view of a preferred configuration of a supply leader included by the present invention.
Figure 3:
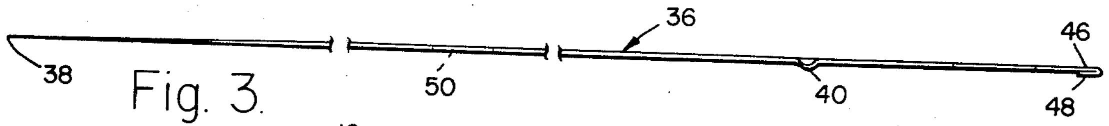
FIG. 3 is a fragmentary side view of the supply leader shown in FIG. 2.

A flexible strip supply leader 36, better shown in FIGS. 2 and 3, is secured to the free end of the wound magnetic tape 20 in conventional manner. The flexible supply leader 36 (as well as the take-up leader 10, FIG. 4) is stiff in relation to conventional "limp" magnetic tape, and can be constructed for example from such materials as are commonly sold under the trademarks Nylon or Mylar and having a preferred thickness of approximately 10 mils. It is further preferred that the width of the supply leader 36 be not greater than the width of the magnetic tape to which an end 38 is secured, and the leader 36 can be provided with interferring means such as "ears" 40 in the vicinity of the supply leader's free end portion 42 for interferring with the flanges of the supply reel 18 to maintain the tape wound about the supply reel 18 during handling and storage.

The free end portion 42 of the supply leader 36 is provided with coupleable means 44 for effecting a couplement with the take-up leader 10. In its preferred embodiment, the supply leader coupleable mean 44 is shaped from the free end portion 42 and includes a "-button" 46, or tab preferably with rounded shoulders, which is somewhat thicker than the remainder of the leader as indicated by the folded back portion 48. The supply leader coupleable means 44 further includes a neck portion 50 of lesser width than the button 46.

Figure 4:
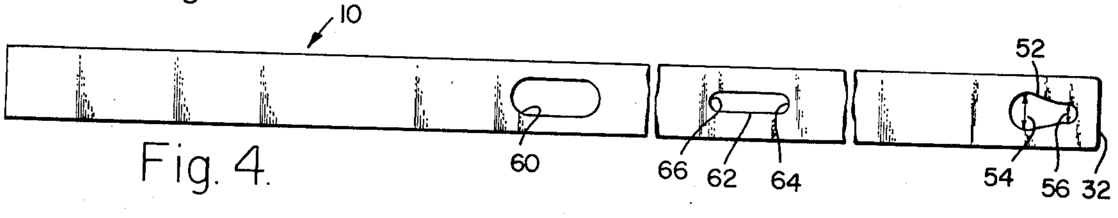
FIG. 4 is a fragmentary plan view of a preferred configuration of a take-up leader included by the present invention.

Turning next to FIG. 4, a preferred configuration of the take-up leader's coupleable means is a "keyhole" shaped aperture 52 near the take-up leader's free end 32, having a major diameter 54 for permitting insertion of the take-up leader button 46, and a minor diameter 56 (greater than the width of the supply leader neck portion 50 but less than the width of the button 46) for retaining the button 46.

It is preferred that the take-up leader 10 and the supply leader 36 be tapered toward their secured ends (as indicated in FIG. 3), so that when coupled one to the other and wound about the take-up reel hub 14, creases are not produced in the magnetic tape taken up because of an abruptly changing significant thickness where the supply leader 36 is secured to the tape and where the take-up leader 10 is secured to the take-up reel hub 14 (FIG. 3).

Recess apertures 58, 60 are respectively provided in the supply leader 36 and the take-up leader 10, and longitudinally spaced from the supply leader button 46 and the take-up leader keyhole aperture 52 in accordance with the circumference of the take-up reel hub 14. In this manner the button 46 is caused to be recessed within the recess apertures 58, 60, for preventing distortion of the tape when the tape is wound in the take-up reel.

A retaining aperture or slot 62 is provided in the take-up leader 10 a predetermined distance from the leader's free end 32. The slot includes a forward boundary 64 and a rearward boundary 66, and the purpose of the retaining slot 62 will be described in connection with FIGS. 5–7.

Figure 5:
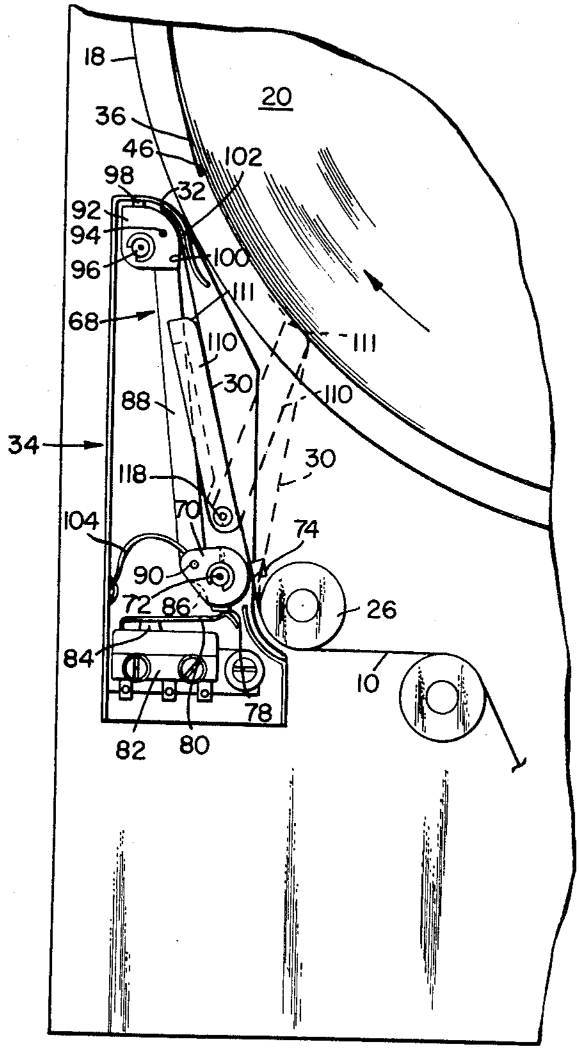
FIG. 5 is an enlarged fragmentary plan view of the lower left-hand portion of FIG. 1, showing the automatic capture device of the present invention, and further including a phantom representation of a biasing finger for effecting leader coupling.
Figure 6:
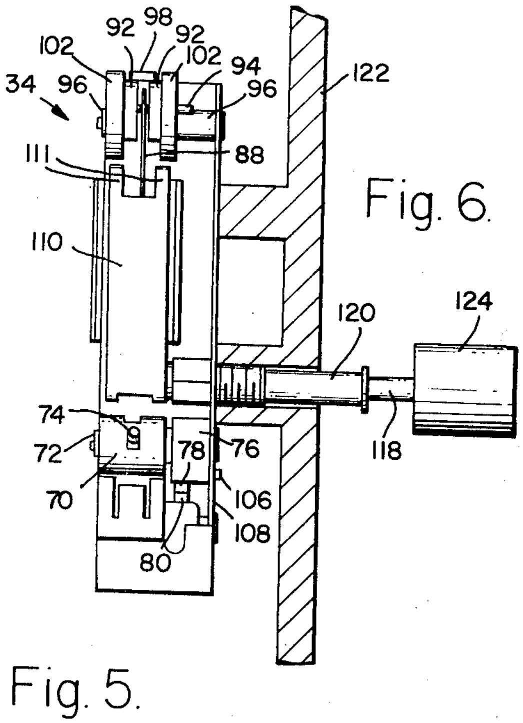
FIG. 6 is a side view of the automatic capture device shown in solid line in FIG. 5, viewed from the left thereof with the take-up leader removed, and including a fragmentary portion of the tape deck shown in cross section.

Turning to FIGS. 5 and 6, the leader capture device 34 includes a bistable mechanism 68 provided with a toggle member 70 pivotable about a pivot pin 72. The toggle member 70 includes a leader retaining pin 74, for insertion in the take-up leader retaining slot 62 and accordingly for retaining the leader when captured by the capture device 34 during times when the tape transport is in its unloaded condition.

A switch actuator cam 76 is coupled to the toggle 70, to pivot about the pivot pin 72 when the toggle 70 is pivoted, and includes a cam surface having a first portion 78 for cooperating with a switching arm 80 of a double throw switch 82. During the unloaded condition, the switching arm 80 causes a switching plunger 84 to place the switch 82 in a first switching configuration for preventing normal operation of the transport apparatus. The switch actuator cam 76 also includes a second cam portion 86 which, when the toggle 70 is in a second position as shown in FIG. 7, causes the switch 82 to assume a second configuration which "signals" the transport's logic circuitry that the tape is ready for normal transport.

Figure 7:
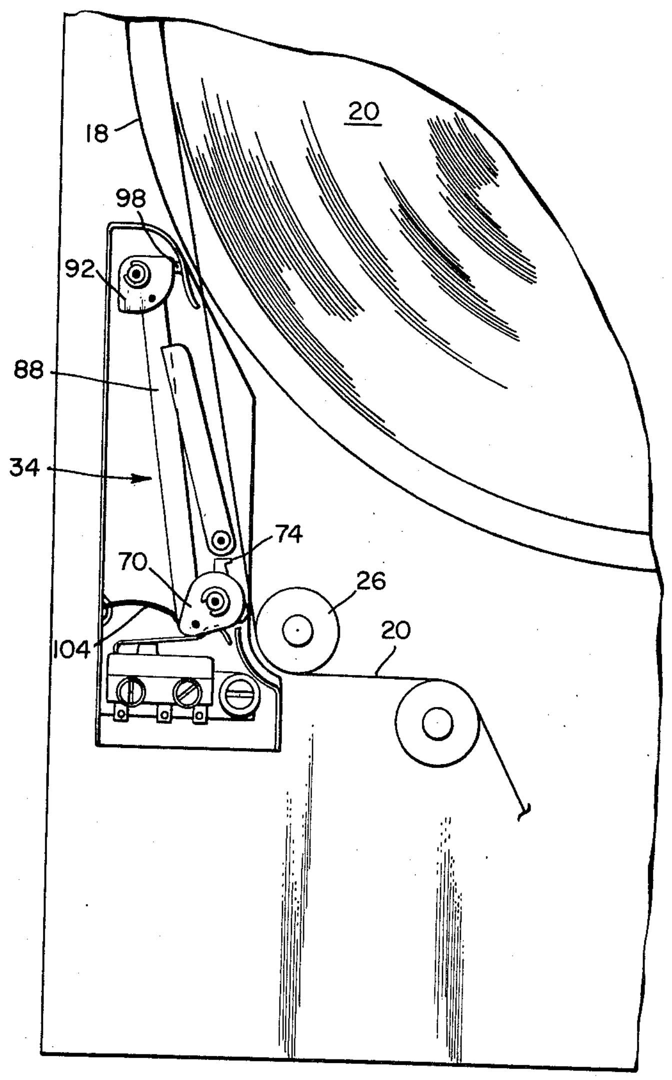
FIG. 7 is a fragmentary plan view of the apparatus shown in FIG. 5, as represented in its web "loaded" condition.

The toggle member 70 is actuated from its first stable position shown in FIG. 5 to its second stable position shown in FIG. 7, through a linkage member 88 coupled to the toggle 70 by means of a second pivot pin 90 and coupled to an actuator cam 92 by means of a third pivot pin 94. The actuator cam 92 is itself pivotable about a fourth pivot pin 96, and includes a cog 98 on an arcuate surface 100, the cog 98 traversable between a pair of leader stripper members 102. The arcuate surface 100 generally follows an arcuate contour of the stripper members 102, and is spaced therefrom by a distance slightly greater than the thickness of the take-up leader end portion 30.

When the transport is in its unloaded condition, the take-up leader's free end 32 is positioned out of the tape transport path and between the arcuate surfaces of the actuator cam 92 and the stripper members 102. During this time, the take-up leader's free end portion 30 is retained captured along the tape path by the retaining pin 74 in cooperation with the leader's retaining slot 62. The toggle member 70 is maintained in this position by a biasing force applied by a spring 104 and a pin 106 secured to the switch actuator cam 76 which travels through two limits of an arcuate slot (not shown) in a housing 108.

When it is desired to cause the supply tape 20 to be threaded along the tape path, a LOAD signal is initiated (such as by depressing a LOAD button, not shown, as conventionally provided in automatic loading transport systems), for causing a finger member 110 to move from its normal position out of the tape path to an active position (represented in dash line) for biasing the take-up leader 10 in the vicinity of the keyhole 52 against the would supply tape 20, such as by a pair of fingers 111 spaced for contacting the leader 10 on both sides of the keyhole 52. At the same time, the LOAD signal causes an auxiliary supply reel drive means to rotate the supply reel 18 in a clockwise or tape winding direction, for example such as by energizing an auxiliary motor means 112 and positioning the motor means to come into drive engagement with a brake drum 114 provided by the supply reel 18 (see FIG. 1). Positioning means 116 actuable by the LOAD signal can be provided for causing the motor 112 to engage the brake drum 114.

In the preferred embodiment, the finger member 110 is caused to move from its normal position to its active position by means of a shaft 118 extending through a bushing 120 in the tape transport deck 122, the shaft 118 being rotatably actuable by a rotary solenoid 124 energized in response to the LOAD signal. Upon energization of the solenoid 124, and upon simultaneous clockwise rotation of the supply reel 18, the button 46 of the supply leader free end portion 42 is clockwise rotated and passes between the spaced fingers 111 and into coupling engagement with the take-up leader keyhole aperture 52. After coupling, continued clockwise rotation of the supply reel 18 causes the take-up leader end portion 30 to move in a generally vertical direction, causing the rearward boundary 66 of the retaining slot 62 to move the leader retaining pin 74 in a counterclockwise direction. The toggle 70 is accordingly similarly rotated, until such time as the spring 104 is triggered from its position shown in FIG. 5 to the position shown in FIG. 7, causing the toggle 70 to assume its second stable position with the leader retaining pin 74 removed from the tape transport path and at the same time causing the actuator cam 92 to be rotated in a clockwise direction into its second stable position, as shown in FIG. 7. The switch actuator cam 76, following the rotation of the toggle 70, causes the switch 82 to signal the tape transport logic circuitry and, in addition, de-energizes the solenoid 124 (returning the arm 110 to its normal position) and signals the actuable means 116 to disengage the auxiliary motor 112 from the supply reel brake drum 114 while de-energizing the motor 112.

At this point, the supply tape 20 can be threaded through the tape transport path by the transport drive apparatus provided in conventional tape transport systems. The apparatus is shown in its "tape loaded" condition in FIG. 7.

Figure 8:
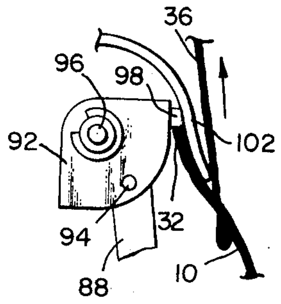
FIG. 8 is a fragmentary plan view of the upper portion of the automatic captive device shown in FIG. 7, indicating the manner in which automatic decoupling is effected.

When it is desired to disengage the supply leader 36 from the take-up leader 10, the supply reel 18 is caused to rotate in a tape winding direction by the rewind apparatus of the tape transport. When the tape is fully rewound, the supply leader 36 continues to move in a generally upward direction, taking with it the free end 32 of the take-up leader 10. The stationary stripper members 102 are positioned to interfere with the couplement provided by the take-up leader keyhole 52 and the supply leader button 46, stripping one from the other as shown in FIG. 8. Just prior to decoupling, the take-up leader free end 32 is guided along the inside surface of the stripper members 104, pushing the cog 98 to rotate the actuating cam 92 until the spring 104 is actuated into its first position, which in turn causes the actuator cam 92 and the toggle member 70 to assume its first position as shown in FIG. 5. This causes the leader retaining pin 74 to become inserted in the take-up leader retaining slot 62, the forward boundary 64 of the slot 62 retaining the take-up leader 10 in its captured position along the tape path, against the tension normally applied to the leader 10 (or the tape 20) while along the tape path. At the same time, the switch 82 causes the conventional tape transport drive means to discontinue its normal transport functions.

Thus, there has been described a preferred embodiment of automatic tape threading apparatus utilizing a captive take-up leader, including automatic means for coupling as well as for decoupling the take-up leader from a supply leader. It should be noted that a separate supply leader is not required when the supply web is of sufficient stiffness to perform the functions otherwise provided by the supply leader described herein, in which case the free end of the supply web can be shaped to include the button 46 and the web can further include the reference aperture 60. Other embodiments of the present invention and modifications of the embodiments herein presented may be developed without departing from the essential characteristics thereof.

Accordingly, the invention should be limited only by the scope of the claims listed below.

What is claimed is:

1. In web transport apparatus including supply means provideable with a wound supply web, web take-up means and a web transport path extending between the supply means and the take-up means, the combination comprising:

a take-up leader having an end secured to the take-up means and a free end, said take-up leader threaded along the web transport path excepting a portion of said take-up leader including said free end;

first coupleable means provided by said take-up leader;

second coupleable means provided by the supply web for cooperating with said first coupleable means to effect a couplement between the supply web and said take-up leader;

actuable means for causing cooperation between said first and second coupleable means to effect said couplement;

decoupling means for automatically decoupling the supply web from said take-up leader when the transported supply web is substantially rewound;

bistable means having a first stable configuration cooperating with said take-up leader such that said take-up leader is threadedly retained along the web transport path, and alternately a second stable configuration for releasing said take-up leader;

first actuating means provided by said take-up leader for actuating said bistable means during decoupling to assume said first stable configuration; and second actuating means provided by said take-up leader for actuating said bistable means during coupling to assume said second stable configuration.

2. The combination according to claim 1, further including retaining means provided by said take-up leader for cooperating with said bistable means when in said first stable configuration such that said take-up leader is retained by said bistable means.

3. The combination according to claim 2, wherein said retaining means is included by said second actuating means.

4. The combination according to claim 2, wherein said second actuating means and said retaining means comprise an aperture in said take-up leader.

5. The combination according to claim 1, wherein said decoupling means includes stationary stripper means positioned out of the web path, for interferring with said couplement and for guiding said take-up leader free end out of the tape path.

6. The combination according to claim 5, wherein said first actuating means comprises said free end.

7. In web transport apparatus including supply means provideable with a wound supply web, web take-up means and a web transport path extending between the supply means and the take-up means, the combination comprising:

a supply leader secured to the supply web, and having a free end;

a take-up leader secured to the take-up means, for extending along the web transport path, and having an end portion including a free end removed from the web path;

first coupleable means provided by said supply leader and second coupleable means provided by said take-up leader, for effecting a couplement therebetween; and stationary means positioned out of the web path, for separating said couplement when said couplement approaches said stationary means while the wound supply web is rotated in a winding direction.

8. In magnetic tape apparatus including supply means provideable with wound magnetic tape, tape take-up means, magnetic transducer means and tape transport means for transporting the tape along a tape transport path such that the tape is in magnetic contact with the transducer means, the combination comprising:

a relatively stiff supply leader secured to the tape and having a free end;

a relatively stiff take-up leader secured to the take-up means, for being threaded along the tape transport path and having an end portion including a free end;

first coupleable means provided by said supply leader and second coupleable means provided by said take-up leader, for effecting a couplement therebetween; and stationary means removed from the tape transport path and positioned for interferring with said couplement to decouple said first and second coupleable means when said couplement approaches said stationary means while said supply leader is transported in a tape winding direction.

9. The combination according to claim 8, wherein said first coupleable means includes a tab means and said second coupleable means includes an eye means.

10. The combination according to claim 8, wherein said first coupleable means includes a button-shaped tab at the free end of said supply leader and said second coupleable means includes a keyhole-shaped aperture near the free end of said take-up leader.

11. The combination according to claim 8, wherein said stationary means includes means for guiding the free end of said take-up leader out of the tape transport path.

12. The combination according to claim 8, further including bistable means actuable from a second stable configuration to a first stable configuration by said take-up leader free end when guided out of the tape transport path, and retaining means provided by said take-up leader end portion for cooperating with said bistable means when in said first configuration, for retaining said take-up leader along the tape transport path.

13. The combination according to claim 12, further including actuable means for causing cooperation between said first and second coupleable means to effect said couplement, and wherein said retaining means provided by said take-up leader end portion cooperates with said bistable means after said couplement is effected for actuating said bistable means to assume said second stable configuration.

14. The combination according to claim 13, wherein said actuable means includes finger means having a normal position out of the tape path and an actuated position for biasing said take-up leader end portion in the vicinity of said first coupleable means against the wound tape;

drive means for rotating the wound tape in a tape winding direction;

finger control means for actuating said finger means from its normal position to its actuated position, and alternately from its actuated position to its normal position when said bistable means is actuated to assume said second stable configuration; and drive control means for causing said drive means to rotate the wound tape in a tape winding direction when said finger means is in said actuated position, and alternately for controlling said drive means to become inoperable when said finger means is actuated to assume said normal position.

* * * * *